Aug. 26, 1969   C. A. FOREMAN   3,462,847
MECHANISM FOR MEASURING STRETCHABLE KNIT TUBING
Filed July 28, 1967   2 Sheets-Sheet 1

INVENTOR
CALEY A. FOREMEN
BY  *Daily & Daily*
ATTORNEYS

Aug. 26, 1969  C. A. FOREMAN  3,462,847
MECHANISM FOR MEASURING STRETCHABLE KNIT TUBING
Filed July 28, 1967  2 Sheets-Sheet 2
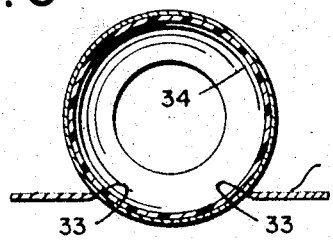
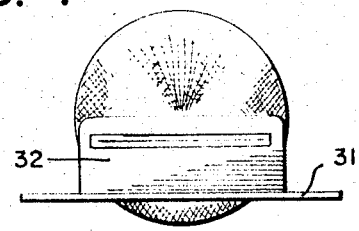
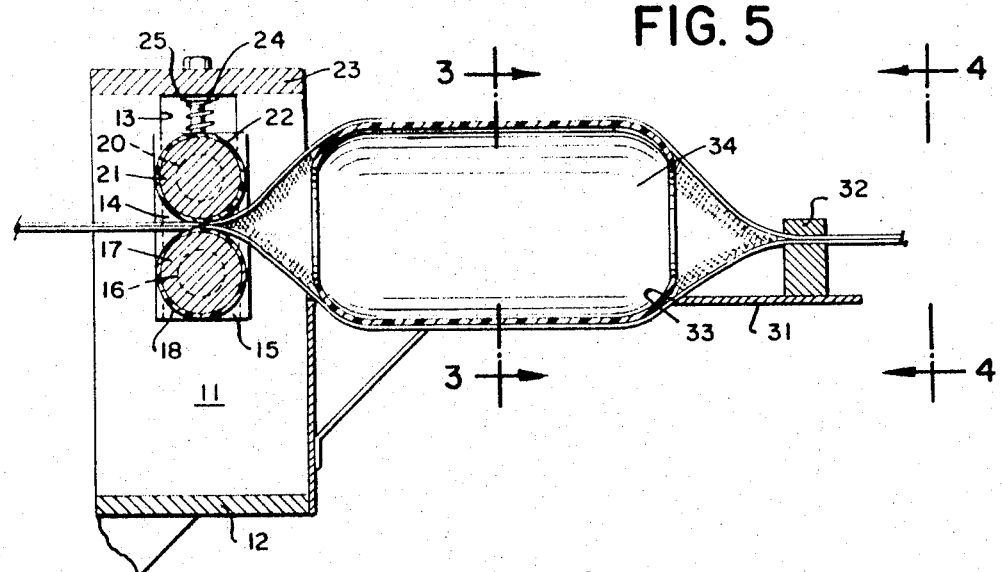
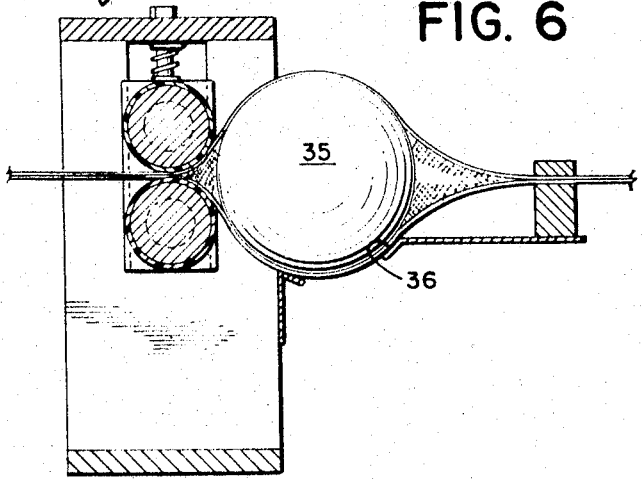
INVENTOR
CALEY A. FOREMAN
BY *Daily & Daily*
ATTORNEYS United States Patent Office 3,462,847
Patented Aug. 26, 1969

3,462,847
MECHANISM FOR MEASURING STRETCHABLE KNIT TUBING
Caley A. Foreman, Grenada, Miss., assignor to U.S. Industries, Inc., New York, N.Y., a corporation of Delaware
Filed July 28, 1967, Ser. No. 656,756
Int. Cl. G01b 5/04
U.S. Cl. 33—127                                8 Claims

ABSTRACT OF THE DISCLOSURE

A device for measuring flexible knit tubing, such as raschel knit fishnet tubing, consisting of a pair of pressure rollers having a brake adjustable to predetermine the effort needed to draw tubing between the rollers. A sphere or cylinder is placed within the tubing adjacent the bight of the pressure rollers, the sphere or cylinder, as the case may be, having a diameter such that the fabric will be stretched, thus assuring that the tubing will enter the rolls in a flat double layer and can be measured accurately with a predetermined degree of stretching force applied during measurement.

---

As indicated hereinabove, raschel knit tubing, ordinarily of an open fishnet pattern, has become common as the material for the making of ladies' hosiery. This raschel tubing is supplied to the hosiery manufacturer in long lengths and it is essential that for a given size stocking the tubing be cut in uniform lengths, since the stockings are formed by utilizing a length of stocking normally cut on a bias and seamed to form a foot portion. Difficulty has been experienced in performing this operation, since when manually performed, different operators will apply different degrees of tension to the tubing and the measurement therefore will not be uniform. When it was attempted to measure the material by placing it between guides exerting pressure thereupon to retard the stocking and make the pull required uniform, it was found that the material did not feed evenly between the guides, but became wrinkled and bunched so that the tension applied by the rollers or other guide members was not in fact uniform. By means of the present invention, guiding and feeding rollers are utilized, being provided with a brake to regulate the tension required to pull the fabric through the rolls, and in addition a ball is inserted in the tube immediately adjacent the bight of the pressure rollers, which ball, or in some instances, cylinder with rounded or pointed ends, serves to assure that the tubular material will enter into the bight of the pressure rollers in two even layers, without wrinkles and bunching, and with the result that the fabric may be measured to uniform lengths without difficulty.

As is clear from the above discussion, the mechanism of my invention is extremely simple and is at the same time extremely efficient and provides a reliable manner of measuring predetermined, uniform lengths of stretchable fabric.

The mode of accomplishing the above-stated and other objects and features of the invention will be apparent when the following description is considered in connection with the appended drawings, in which:

FIGURE 3 is a vertical cross-sectional view through the fabric at a point immediately behind the pressure rollers, showing a cylinder with rounded ends in use to cause the fabric to enter between the rollers in two flat unwrinkled layers, the view being taken on the plane of the line 3—3 of FIGURE 5;

FIGURE 4 is a view taken behind the initial guiding member for the fabric, the view being taken on the plane of the line 4—4 of FIGURE 5;

FIGURE 5 is a vertical cross-sectional view longitudinally of the fabric, as indicated by the line 5—5 of FIGURE 1, again showing the positioning of a cylinder to guide the fabric into even layers between the pressure rollers; and FIGURE 6 is a view similar to FIGURE 5, but showing the utilization of a sphere in place of a cylinder for performing the smoothing and de-wrinkling operation.

Figure 1:
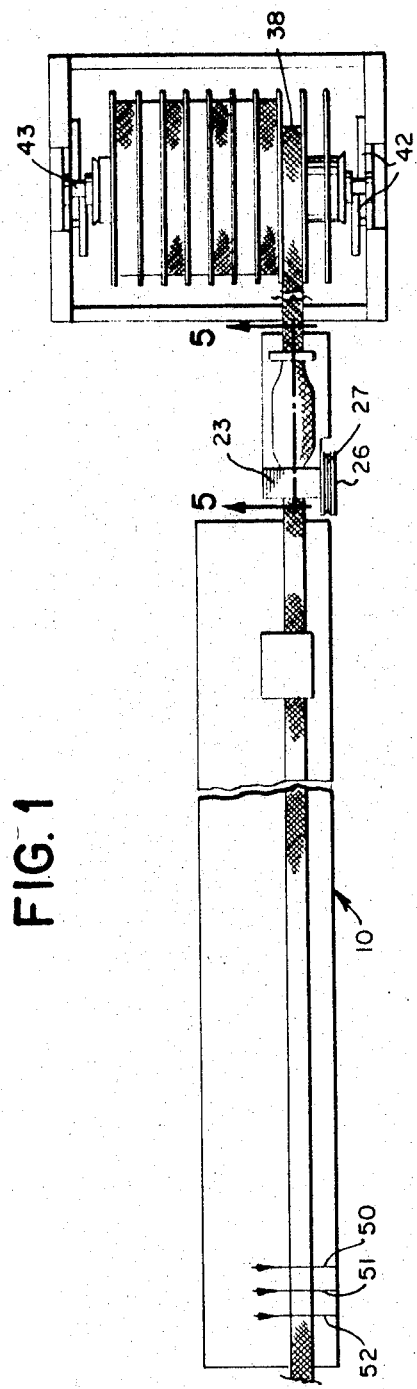
FIGURE 1 is a top-plan view of the mechanism of my invention.

Referring now to the drawings, a table 10 is provided, this table having secured thereto at its right-hand end (as seen particularly in FIGURES 1 and 2), a plate bracket 12 to which a pair of plates 11 are fixed at the opposite sides. Each of the plates 11 has a slot 13 extending downwardly from the top thereof, and mounted in each of the slots is a pair of grooved bearing blocks 14 and 15 (FIGURES 5 and 6).

Mounted in the lower bearing blocks 15 is a shaft 16 having a pressure roller 17 fixed thereto or integral therewith, the roller 17 having a surface 18 of rubber or other soft resilient material.

Similarly mounted in the upper bearing blocks 14 is a shaft 20 carrying an upper pressure roller 21 having a rubber surface indicated at 22.

Extending between the plates 11 at the top thereof is an upper or cover plate 23, which has guide pins 24 extending downwardly therefrom, which pins are surrounded by springs 25 which bear against the upper portions of the bearing blocks 14 and against the lower surface of the plate 23 and thus assure that the upper rollers 21 bear against the lower rollers 17 with a desired pressure.

Mounted on the forward end of the lower shaft 16 is a sheave 26 over which a belt or cord 27 extends, the cord being provided with a weight 28 at one end thereof and being, at its opposite end, fixed to the plate 11 by means of a pin 30. By modifying the weight 28, the drag on the rollers may be adjusted and thus the degree to which the fabric passing through the rolls is stretched in pulling it to a desired length, regulated.

Fixed to the housing structure formed by the plates 11, 12, and 23 is a small table 31 on which a guide member 32 is suitably fixed. The table 31 is provided with a cut-out 33 (FIGURE 5) which locates the cylinder 34 over which the fabric passes on its way from the supply reels to the bight of the pressure rollers. The cylinder 34, or the sphere 35 of FIGURE 6, are important elements of my invention and serve to assure that the fabric is fed to the bight of the pressure rollers 17 and 21 in a double layer which is smooth and unwrinkled and does not therefore cause variations in pressure and in resistance to passage between the pressure rollers.

As indicated, the small table 31 is provided with a rectangular cut-out when the cylinder such as 34 is utilized, and would of course be supplied with a circular cut-out in the case of the sphere 35 of FIGURE 6, the cut-out there being designated 36. However, the cut-outs are not essential, since the sphere or cylinder will move toward the bight of the rolls due to the feeding of the fabric itself and will be properly positioned whether or not this cut-out is provided to retain it in the particular position.

Figure 2:
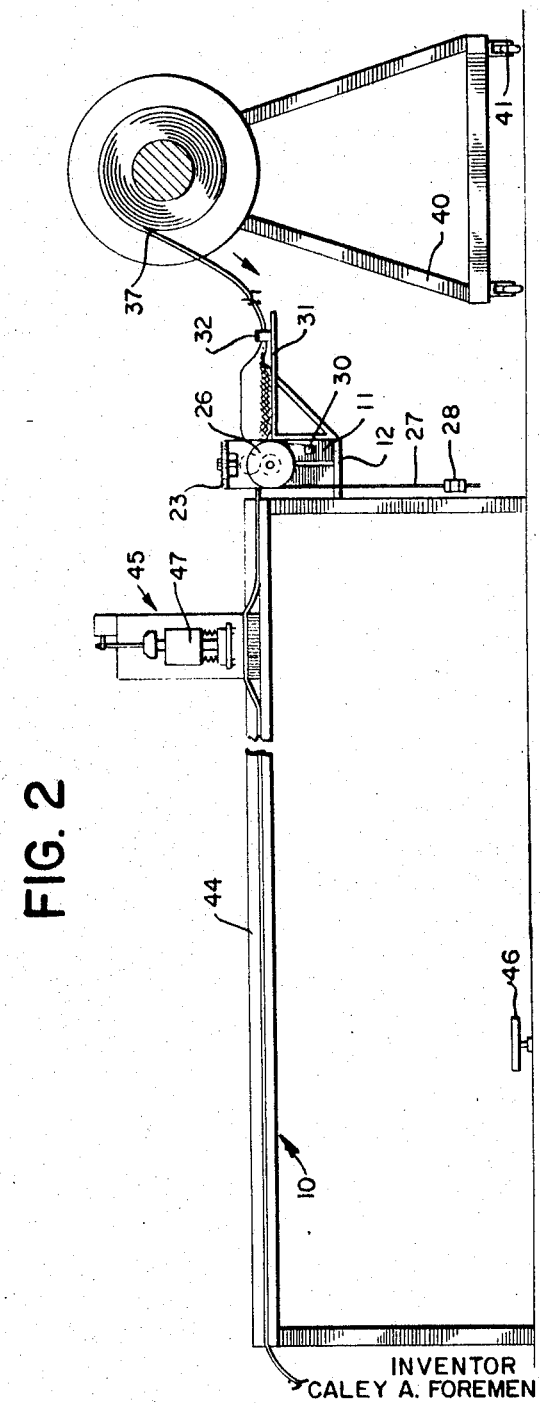
FIGURE 2 is a side-elevational view of the mechanism.

As is clearly seen in FIGURES 1 and 2, a fabric material designated 37 is fed from reels such as indicated at 38 mounted on a stand 40, which stand is preferably provided with caster 41 so that it may readily be moved into position. The stand is of a common form, including rollers 42 on which a shaft 43 is positioned, a plurality of rolls of tape 38 being in turn journaled on the shaft 43. This arrangement makes it possible to readily place a full reel of tubing in position to be fed between the pressure rollers 17 and 21 and assures that the flow of materials to the measuring device is substantially uninterrupted.

Mounted on the top 44 of table 10 is a marking device 45 which may be of any suitable form, but is preferably a solenoid operated stamping device which stamps the fabric with a line of washable ink or the like extending generally across the fabric so that an operator can, by operation of a foot pedal indicated at 46, cause energization of the solenoids 47 of the stamping device and the marking of the fabric.

At the left-hand side of the table as seen in FIGURES 1 and 2, the table is provided with a plurality of index marks 50, 51, and 52, which are correlated to the various sizes of stockings which are to be manufactured.

In operating the device, the operator pulls a length of fabric until the left end thereof is on one of the marks 50, 51, or 52, and then operates the foot pedal 46 to actuate the stamping device 47. She then grasps the fabric again, and again pulls to the left until the mark thereon its at the proper index point, 50, 51, or 52, and again operates the foot pedal. As will be seen, standard lengths of fishnet fabric are thus drawn from the supply rolls and marked and are then accumulated in a receptacle (not shown) located at the left-hand end of the table.

Thus, due to the usage of the pressure rollers with the friction drag thereon, and of the sphere or cylinder within the tubing fabric, and adjacent the bight of the pressure rollers, the fabric is caused to be drawn off evenly and with a uniform resistance so that the fabric is stretched the same amount for each measurement, resulting in uniform lengths being measured.

It will be obvious that by means of additional pressure rollers a fabric many automatically be drawn from the supply reels and marked for cutting or in fact may be automaticlly cut into lengths at the marked positions. In some instances it may be desirable to render the entire operation automatic so that the fabric is drawn by means of indexing feed rollers and cut after passage through those rollers at points determined by the prior indexing of the fabric when stretched to the standard extent, which points can of course be correlated with the feeding of the fabric through the draw-off rollers, as for example, by means of marking devices and utilization of photocell devices for stopping of the mechanism and performing the cutting at the marked points. It will of course be understood that the ink utilized for the marking is washable so that the fabric will not bear the markings when put into use in stockings or the like.

Thus it is seen that various modifications of my invention may be made and I wish therefore not to be limited to the preferred embodiments described herein.

What is claimed is:
1. In a device for measuring stretchable tubular fabric, in combination, a pair of rollers, means urging said rollers together with a predetermined pressure, means for frictionally braking at least one of said rollers to produce a predetermined resistance to revolution, means for supplying a stretchable tubular knit fabric to the bight of said rollers in flat form with the two layers even and unwrinkled, comprising a supply reel having flattened tubular fabric wound thereon and a stretching member formed as a surface of revolution within the tubular fabric between said supply reel and said roller bight, said stretching member being totally enclosed by said fabric and supported partially thereby, means for maintaining said stretching member in close proximity to said rollers, and means for indicating on the fabric desired standard lengths thereof when a length of fabric has been pulled through said roller bight and the end brought to a predetermined position.

2. A device as claimed in claim 1 wherein said stretching member is a cylinder of a diameter substantially equal to the diameter of the completely stretched tubular fabric, said cylinder having reduced diameter ends.

3. A device as claimed in claim 1 wherein said stretching element is a sphere of a diameter substantially equal to the diameter of the completely stretched tubular fabric.

4. A device as claimed in claim 2 wherein said cylinder is hollow.

5. A device as claimed in claim 3 wherein said sphere is hollow.

6. A device as claimed in claim 1 wherein said pressure rollers are mounted adjacent a work surface, said work surface being provided with a plurality of length indicia, and a marking device located between said rolls and said indicia whereby the tubular fabric may be drawn between said rollers, aligned with a selected one of said indicia and marked to predetermined length.

7. A device as claimed in claim 1 wherein said frictional braking means comprises a sheave fixed for rotation with one of said rolls and friction means engaging said sheave.

8. A device as claimed in claim 7 wherein said friction means comprises a cord fixed at one end, passing over said sheave and carrying a weight at its opposite end.

References Cited

UNITED STATES PATENTS

| 2,415,824 | 2/1947 | Katz et al. | 112—63 |
| 2,347,901 | 5/1944 | Gardner et al. | 112—63 |
| 1,855,784 | 4/1932 | Young | 33—127 |

ROBERT B. HULL, Primary Examiner

F. J. D'AMBROSIO, Assistant Examiner